US012638596B2

(12) United States Patent
Zalcberg et al.

(10) Patent No.: US 12,638,596 B2
(45) Date of Patent: May 26, 2026

(54) SYSTEM AND METHOD FOR TIMING SYNCHRONIZATION AND TRACKING OF SATELLITE SIGNAL RECEIVERS

(71) Applicant: Tupaia Ltd., Ramat-Hasharon (IL)

(72) Inventors: Gad Zalcberg, Karney Shomron (IL); Yuval Chipman, Givatayim (IL); Kobi Scheim, Pardess-Hanna (IL); Nadav Lavi, Ramat-Hasharon (IL)

(73) Assignee: Tupaia Ltd., Ramat-Hasharon (IL)

( * ) Notice: Subject to any disclaimer, the term of this patent is extended or adjusted under 35 U.S.C. 154(b) by 647 days.

(21) Appl. No.: 17/808,227

(22) Filed: Jun. 22, 2022

(65) Prior Publication Data

US 2023/0077069 A1      Mar. 9, 2023

Related U.S. Application Data

(60) Provisional application No. 63/213,918, filed on Jun. 23, 2021.

(51) Int. Cl.
*G01S 19/25* (2010.01)
*G01S 19/10* (2010.01)

(52) U.S. Cl.
CPC ............ *G01S 19/256* (2013.01); *G01S 19/10* (2013.01)

(58) Field of Classification Search
CPC ................................ G01S 19/256; G01S 19/10
See application file for complete search history.

(56) References Cited

U.S. PATENT DOCUMENTS

| | | | | |
|---|---|---|---|---|
| 9,261,599 | B1* | 2/2016 | Golden | G01S 19/23 |
| 9,544,079 | B2 | 1/2017 | Dalvi et al. | |
| 2007/0021122 | A1* | 1/2007 | Lane | H04W 56/0025 |
| | | | | 455/67.16 |
| 2008/0278373 | A1* | 11/2008 | Monnerat | G04G 7/02 |
| | | | | 342/357.66 |
| 2009/0182502 | A1 | 7/2009 | Riter et al. | |
| 2010/0030916 | A1* | 2/2010 | Greenwood Graham | |
| | | | | H04W 56/006 |
| | | | | 709/248 |

(Continued)

OTHER PUBLICATIONS

Xue, X., Qin, H., & Lu, H., "High-precision time synchronization of kinematic navigation system using Gnss Rtk Differential Carrier Phase Time Transfer," Measurement, 176, 109132. https://doi.org/10.1016/j.measurement.2021.109132 (Year: 2021).*

(Continued)

*Primary Examiner* — William Kelleher
*Assistant Examiner* — Noah Yi Min Zhu
(74) *Attorney, Agent, or Firm* — M&B IP Analysts, LLC

(57) ABSTRACT

A system and method for timing synchronization of global navigation satellite system (GNSS) receivers is presented. An end point equipment (EPE) of a plurality of EPEs is matched to at least one control station at a predetermined distance, which are in a user satellite network. Relative positions are determined for each matched EPE and the at least one control station based on differencing of raw measurements and a plurality of relative positions is collected of the determined relative position of each match. An absolute clock offset is estimated based on clock information of the at least one control station and the plurality of relative positions. The absolute clock offset is used to cause a time synchronization in a first EPE of a plurality of EPEs.

21 Claims, 7 Drawing Sheets

(56)        References Cited

U.S. PATENT DOCUMENTS

| 2011/0285589 | A1* | 11/2011 | Bull | G01S 19/48 |
| | | | | 342/387 |
| 2012/0303304 | A1* | 11/2012 | Kim | G01V 15/00 |
| | | | | 702/65 |
| 2013/0141282 | A1* | 6/2013 | Peyrotte | B64G 1/1085 |
| | | | | 342/424 |
| 2013/0335266 | A1* | 12/2013 | Vollath | G01S 19/07 |
| | | | | 342/357.25 |
| 2015/0119079 | A1* | 4/2015 | Tarlazzi | H04W 24/00 |
| | | | | 455/456.1 |
| 2015/0268352 | A1* | 9/2015 | Fischer | G01S 19/23 |
| | | | | 342/357.27 |
| 2015/0369924 | A1* | 12/2015 | Hedgecock | G01S 19/51 |
| | | | | 342/357.34 |
| 2017/0067998 | A1 | 3/2017 | Cheon | |
| 2017/0254901 | A1* | 9/2017 | Kim | G01S 19/215 |
| 2017/0254904 | A1* | 9/2017 | Zhodzishsky | G01S 19/44 |
| 2017/0285173 | A1 | 10/2017 | Subburaj et al. | |
| 2018/0024247 | A1* | 1/2018 | Carter | G01S 19/06 |
| | | | | 342/357.26 |
| 2018/0332546 | A1 | 11/2018 | Aoki | |
| 2019/0120973 | A1* | 4/2019 | Martin | G01S 19/256 |
| 2020/0241146 | A1 | 7/2020 | Kim et al. | |
| 2021/0072707 | A1 | 3/2021 | Hisashima et al. | |
| 2021/0297147 | A1* | 9/2021 | Qaise | G01S 19/00 |
| 2021/0333413 | A1* | 10/2021 | Zyryanov | G01S 19/235 |

OTHER PUBLICATIONS

Sheng C, Gan X, Yu B, Zhang J., "Precise Point Positioning Algorithm for Pseudolite Combined with GNSS in a Constrained Observation Environment," Sensors (Basel). Feb. 18, 2020;20(4):1120. doi: 10.3390/s20041120. PMID: 32085656; PMCID: PMC7071397. (Year: 2020).*

* cited by examiner

SYSTEM AND METHOD FOR TIMING SYNCHRONIZATION AND TRACKING OF SATELLITE SIGNAL RECEIVERS

CROSS-REFERENCE TO RELATED APPLICATIONS

This application claims the benefit of U.S. Provisional Application No. 63/213,918 filed on Jun. 23, 2021, the contents of which are hereby incorporated by reference.

TECHNICAL FIELD

The present disclosure relates generally to satellite systems, more particularly to timing synchronization in satellite networks.

BACKGROUND

Global navigation satellite systems (GNSS) including the global positioning system (GPS) of the US, BeiDou of China, Galileo of the European Space Agency, and GLO-NASS of Russia are positioning technologies that use signals from satellites to provide accurate information about a user's positional information (e.g., location, speed, direction of travel, etc.). Such satellite systems include multiple satellites with each broadcasting signals to a receiver unit on earth.

A GNSS receiver typically includes at least one antenna, which is at the user location to receive radio signals from the satellites and/or control stations at line of sight (LoS). Such signals may be processed by the receiver for parameters such as position, velocity, time, or attitude of the mounted target platform. Time, in particular, is a critical component for satellite systems for estimating satellite and receiver distance, estimating end point equipment (EPE) position, and time-matching of broadcasted signals from the satellites, which in return provide for positional information.

At another aspect, the EPEs are involved in communication services, for example, satellite-communication based service. Such satellite-communication protocols are highly sensitive to the user EPE clock quality as data transfer in modern communication protocols pose strict time synchronization requirements. Both elements (i.e., ranging and communications) in the system are built with tightly coupled requirements of clock source stability and quality.

However, it has been identified that the GNSS receiver clock may drift relative to a stable GNSS time, and such clock offsets in the satellites and GNSS receivers are identified as one of the largest errors in GNSS measurements. Clock bias is particularly problematic for carrier phase-based applications that require high accuracy, such as attitude determination, as well as for high quality data transfer in communication services. Broadcast clock correction is often implemented at the EPE's receiver to reduce such errors but does not fully eliminate them. Further, typical quartz crystal clocks at the EPE may be replaced with more accurate clocks for possibly increasing accuracy, but at a much higher cost and complexity.

Increasing clock accuracy while preserving cost of satellite-communication receivers is a particularly important factor with increasing perspective of satellite-communication as a promising technology for broadband Internet service. To realize such Internet service, a system that includes a satellite dish is physically installed outdoors at each user location to receive signals from the satellites and/or control stations. To this end, a high cost and complex satellite Internet based system is impractical for wide distribution of reliable satellite-communication.

It would therefore be advantageous to provide a solution that would overcome the challenges noted above.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments, and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "some embodiments" or "certain embodiments" may be used herein to refer to a single embodiment or multiple embodiments of the disclosure.

Certain embodiments disclosed herein include a method for timing synchronization of global navigation satellite system (GNSS) receivers. The method comprises: iteratively matching each end point equipment (EPE) of a plurality of EPEs to at least one control station at a predetermined distance, wherein each EPE includes a GNSS receiver clock, wherein the plurality of EPEs and the at least one control station are in a user satellite network; determining a relative position of each matched EPE and the at least one control station based on differencing of raw measurements, wherein a plurality of relative positions is collected of the determined relative position of each matched EPE and the at least one control station; estimating an absolute clock offset based on clock information of the at least one control station and the plurality of relative positions, wherein the absolute clock offset is an offset between a first EPE of the plurality of EPEs and GNSS time; and causing a time synchronization in the first EPE of the plurality of EPEs based on the estimated absolute clock offset.

Certain embodiments disclosed herein also include a non-transitory computer readable medium having stored thereon causing a processing circuitry to execute a process, the process comprising: iteratively matching each end point equipment (EPE) of a plurality of EPEs to at least one control station at a predetermined distance, wherein each EPE includes a GNSS receiver clock, wherein the plurality of EPEs and the at least one control station are in a user satellite network; determining a relative position of each matched EPE and the at least one control station based on differencing of raw measurements, wherein a plurality of relative positions is collected of the determined relative position of each matched EPE and the at least one control station; estimating an absolute clock offset based on clock information of the at least one control station and the plurality of relative positions, wherein the absolute clock offset is an offset between a first EPE of the plurality of EPEs and GNSS time; and causing a time synchronization in the first EPE of the plurality of EPEs based on the estimated absolute clock offset.

Certain embodiments disclosed herein also include a system for timing synchronization of global navigation satellite system (GNSS) receivers. The system comprises: a processing circuitry; and a memory, the memory containing instructions that, when executed by the processing circuitry, configure the system to: iteratively match each end point equipment (EPE) of a plurality of EPEs to at least one control station at a predetermined distance, wherein each EPE includes a GNSS receiver clock, wherein the plurality of EPEs and the at least one control station are in a user satellite network; determine a relative position of each matched EPE and the at least one control station based on differencing of raw measurements, wherein a plurality of relative positions is collected of the determined relative position of each matched EPE and the at least one control station; estimate an absolute clock offset based on clock information of the at least one control station and the plurality of relative positions, wherein the absolute clock offset is an offset between a first EPE of the plurality of EPEs and GNSS time; and cause a time synchronization in the first EPE of the plurality of EPEs based on the estimated absolute clock offset.

BRIEF DESCRIPTION OF THE DRAWINGS

The subject matter disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings.

DETAILED DESCRIPTION

Figure 1A:
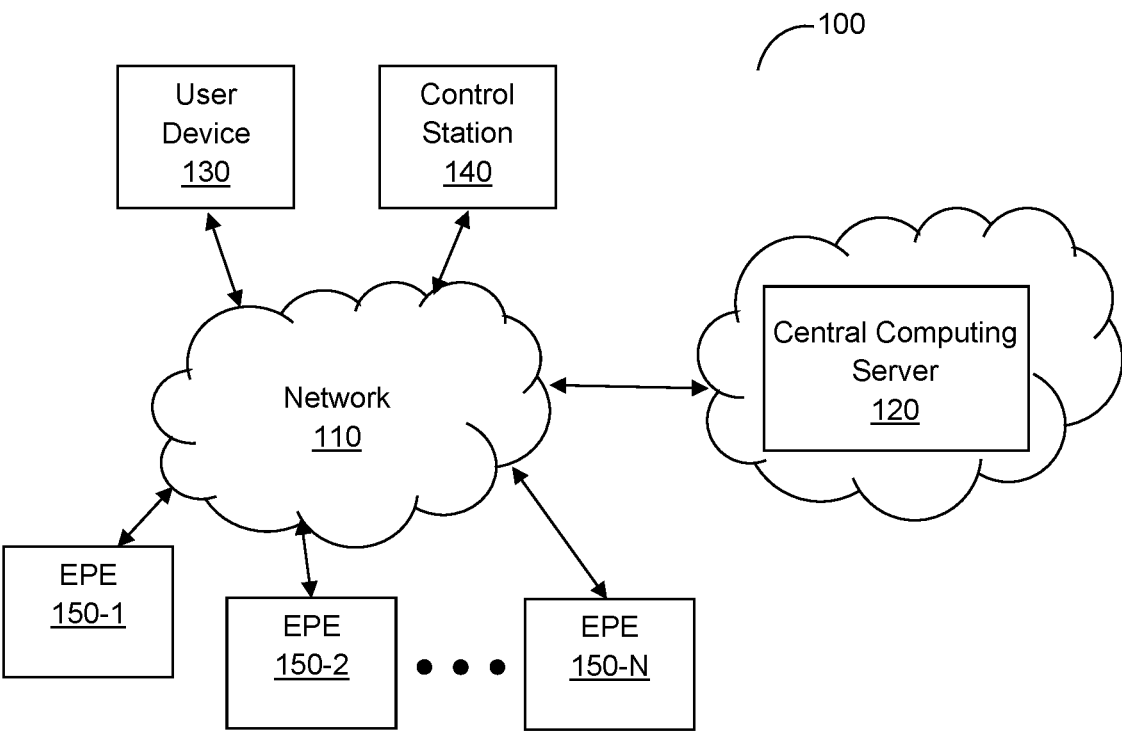
FIG. 1A is a network diagram utilized to describe the various disclosed embodiments.

It is important to note that the embodiments disclosed herein are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

The various disclosed embodiments include techniques for time synchronization of an end point equipment (EPE) in the user satellite-communication network. It has been identified that satellite-communication inherently depends on time precision, which is used in calculating ranges and distances and particularly critical for communication protocol efficiencies. To this end, the disclosed embodiments allow for effectively estimating relative and absolute clock offsets of the EPEs. In particular, a user satellite-communication network is communicatively connected to a server capable of managing multiple EPEs and control stations within the network. Presence of such managing server allow use of standard GNSS receivers and clocks in the EPE, eliminating high cost and complexity issues. Furthermore, the disclosed embodiments result in a better performing clock reference for each EPE in the network with respect to a single EPE setting.

It has been identified that standard GNSS clocks residing on conventional EPEs show clock drifts that may be problematic over time. However, the disclosed embodiments provide a technique to correct such clock drift errors by analyses at the server. More specifically, the control stations in the user satellite-communication network provide an accurate clock source to improve clock accuracy at the EPE, and in return the whole satellite-communications network. The disclosed embodiments further provide clock information to each EPEs that may be utilized to improve correction of other common errors such as, but not limited to, multipath errors, Ionosphere errors, and Troposphere errors. In a non-limiting example, the disclosed techniques enable time synchronization at nanosecond level compared to other methods. In this regard, the improvement in time synchronization using GNSS signals increases accuracy in EPE positional information, and thus the quality and efficiency of various satellite-communication services.

In an embodiment, signals from medium earth orbit (MEO) satellites, and low earth orbit (LEO) satellites are received and processed for satellite-communication. The MEO satellite are situated between the geostationary orbit (GEO) and the LEO between 5,000 and 30,000 km above the surface of the Earth and typically takes two to sixteen hours to complete one orbit around the Earth. GNSS satellites, as an example, are orbiting in altitudes of 20000-28000 km with typically two earth orbits per day. The closest orbiting satellite are the LEO satellites which orbit at about 200 to 2000 km above the Earth's surface. These LEO satellites tend to be smaller in size and orbits at high angular velocity to complete an orbit in about 100 minutes or less. The proximity of such satellites significantly decreases the latency of communication while increasing signal strength.

FIG. 1A shows an example network diagram 100 utilized to describe the various disclosed embodiments. In the example network diagram 100, a user device 130, a plurality of EPEs 150-1 through 150-N (hereinafter referred to individually as a EPE 150 and collectively as EPEs 150, merely for simplicity purposes), a control station 140, and a central computing server 120 are communicatively connected via a network 110. The network 110 may be, but is not limited to, a wireless, cellular (e.g., third-generation (3G), fourth-generation (4G), fifth-generation (5G), and more) or wired network, a local area network (LAN), a wide area network (WAN), a metro area network (MAN), the Internet, the worldwide web (WWW), satellite-based communications network (SATCOM) similar networks, and any combination thereof. A single network 110 is shown in FIG. 1A for simplicity. However, it should be noted that the network 110 may simultaneously involve multiplicity of above-mentioned networks to connect the different components.

The user device 130 may be, but is not limited to, a personal computer, a laptop, a tablet computer, a smartphone, a wearable computing device, or any other device capable of receiving, processing and displaying notifications. The user device is configured to receive satellite communication signals from the EPE 150, for example, though a local area network (LAN). The user device may also generate information such as emails, video, voice, data, and more, along with network control signals used to optimize the entire SATCOM network operation.

The EPE 150 is a communications component configured to relay signals between a user and a plurality of GNSS (i.e., receive) and communication satellites (i.e., receive and transmit). In an embodiment, these signals, and particularly from the communication satellites, may provide broadband Internet satellite communication. In an example embodiment, the closest orbiting LEO satellites are utilized for fast and low latency Internet satellite service. Due to their high angular velocity and short visibility time, a satellite internet constellation consisting of a plurality of LEO satellites needs to be established for continuous service. Here, control stations 140 on Earth relay satellite data to and from the plurality of satellites (connected individually or simultaneously), as well as to the EPEs 150 to provide such Internet satellite service to a user device 130, for example, at the user location.

According to the disclosed embodiments, the EPE 150 is connected to the central computing server 120 over the network 110. The EPE 150 is configured with a standard GNSS receiver to provide raw measurements and coarse positional and time information based on the GNSS signals received from GNSS satellites and/or control station 140. Based on these measurements from one or more EPEs 150 in combination with control station 140 data, the server 120 can perform analyses to determine clock offset, and thus time synchronize the EPEs in the user satellite network.

Figure 1B:
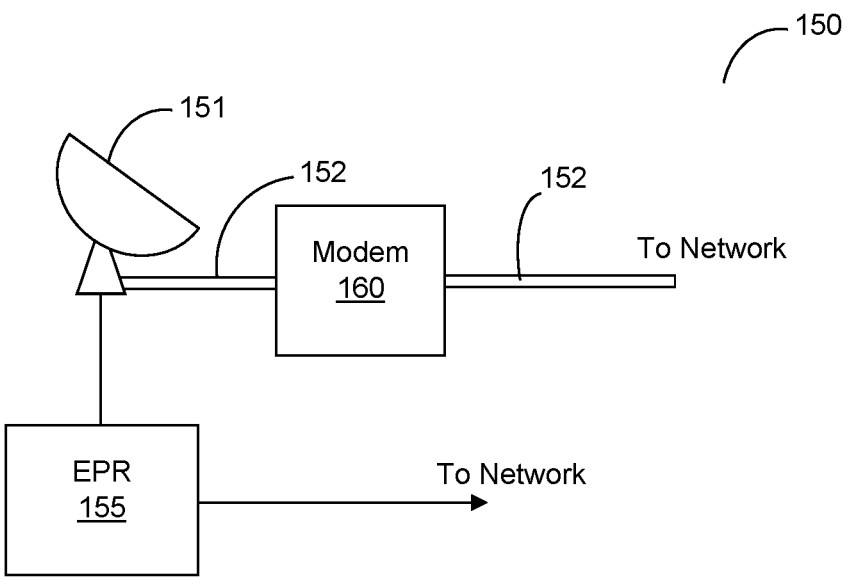
FIG. 1B is a schematic diagram of an end point equipment (EPE) designed according to an embodiment.

FIG. 1B shows a schematic diagram of an EPE 150 according to an embodiment. As disclosed above, the EPE 150 is configured to receive radio frequency signals from the satellites at the user's premise for satellite-communication. The EPE 150 may include a satellite dish 151 connected to a modem (or router) 160 via a cable 152, such as Ethernet radio-frequency coaxial or power cable. Internet satellite communication signals received from the satellite dish 151 are relayed to the modem 160, providing Internet satellite service to the user through a network. For satellite-communication services, the satellite dish 151 may include a communication antenna array with beam forming capability or an antenna with mechanical steering and a receiver to communicate with communication satellites (typically, Low Earth Orbit (LEO) or Medium Earth orbit (MEO)) satellites.

In an embodiment, the satellite dish 151 may include at least one of: a GNSS antenna, a communication antenna, a receiver, and a processing circuit. In particular, the EPE 150 may include an end point receiver (EPR) 155 for receiving and processing signals from at least one GNSS antenna. The EPR 155 is configured to collect raw measurements such as, but not limited to, code phase, carrier phase, frequency doppler shift, carrier-to-noise ratio (CNR) per each received satellite, multipath indication, cycle slip indication, and the like. These raw measurements may be then transferred to the central computing server (120, FIG. 1A) over the network.

Figure 2:
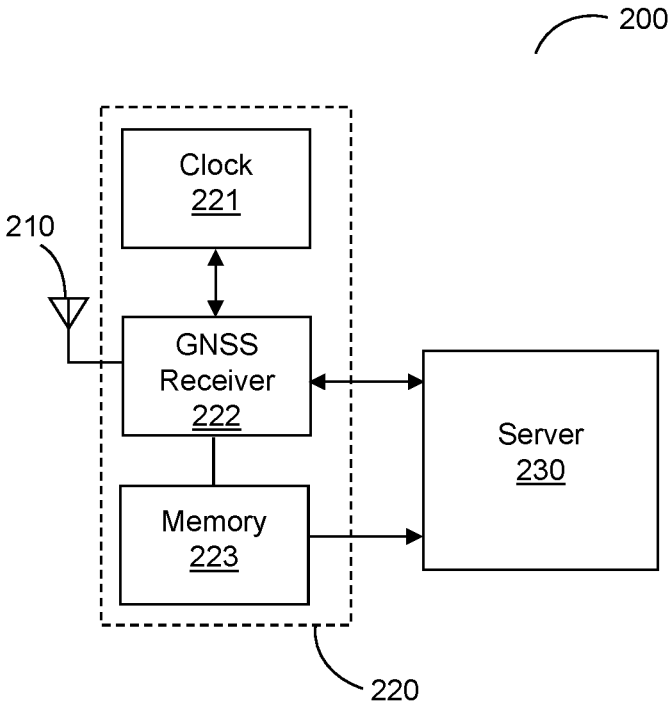
FIG. 2 is a block diagram of a time synchronizing system according to an embodiment.

FIG. 2 is an example block diagram of a time synchronizing system according to an embodiment. In the example block diagram 200, a clock 221, GNSS receiver 222, and a memory 223 are components within the EPR 220. In an embodiment, the clock 221 is a standard satellite receiver clock, such as a quartz oscillator, to track time at the EPR 220. The GNSS receiver 222 is coupled to at least one GNSS antenna 210 on the satellite dish that receives signals from the GNSS satellites. Raw measurements collected by the GNSS receiver 222 are stored at the memory 223 and/or transmitted to the server 230.

The GNSS receiver 222 is configured to decode the satellites ephemerides by decoding almanac and ephemeris data broadcasted by the GNSS satellites. The processing of the decoded information results in each satellites' precise location in space and time. The GNSS receiver 222 may be further configured to perform coarse positioning and timing estimation of the residing EPE. Such processed parameters may be communicated to the central computing server 230.

Figure 3:
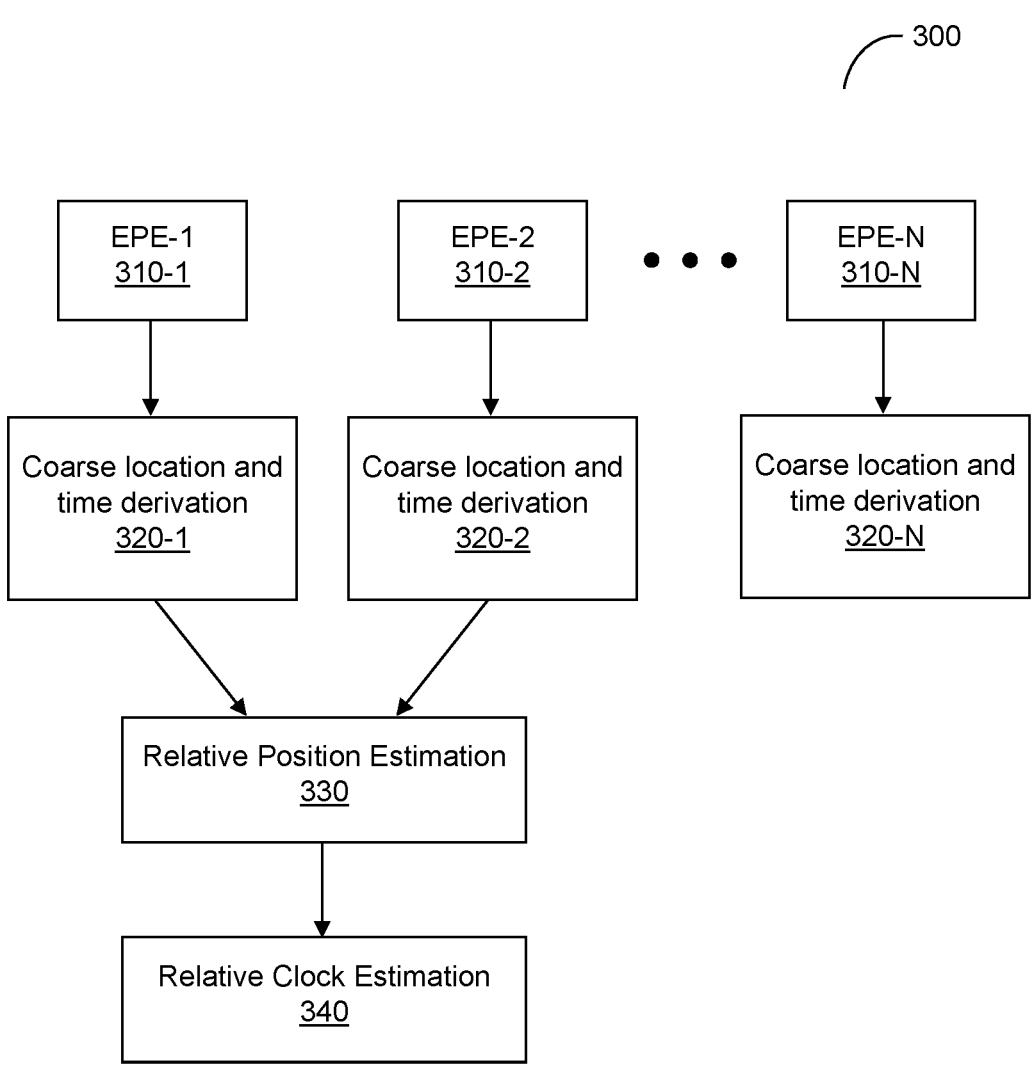
FIG. 3 is a flow diagram illustrating logical components of relative position and clock estimation of EPEs according to an embodiment.

FIG. 3 is an example flow diagram 300 illustrating logical components of relative position and clock estimation of EPEs according to an embodiment. As noted above, a plurality of EPE from 310-1 through 310-N (wherein N is an integer equal or greater than 2) are located at different user locations to receive and transmit satellite signals. In particular, GNSS satellite signals are received to determine raw measurements, including code phase, carrier phase, frequency doppler shifts, and tracking status flags, to name a few. The EPEs 310-1 to 310-N are communicatively connected through a network (110, FIG. 1A); and together with control stations are referred to as the user satellite network.

Each EPE 310 is realized with a standard GNSS receiver for coarse location and time derivation 320-1 through 320-N by utilizing locally received raw measurements and time differences. Here, N in the coarse location and time derivations 320 correlates with the respective EPEs 310. In an embodiment, the coarse location and time derivation 320 at a standalone mode may be performed at each EPE 310, individually. In another embodiment, the coarse location and time derivation 320 may be performed at the server (230, FIG. 2). The results from the coarse location and time derivation 320 may be recorded and/or transmitted to the server for relative position estimation 330.

From the plurality of EPEs 310 in the user satellite network, two EPEs 310 located in proximity of less than few kilometers (e.g., two kilometers) from each other are selected as a pair to perform relative position (i.e., receiver baseline) estimation 330 typically involving phase measurements collected concurrently from both EPEs 310. It has been identified that the relative position estimation 330 increases the accuracy by two orders of magnitude compared to the standalone mode that performs coarse location and time derivation 320. The results of relative position estimation 330 are incorporated with the differencing of raw measurements of the EPE 310 pair for relative clock estimation 340. The relative clock estimation 340 is derived from single difference observables, where the receivers in the EPE pair receive signals from a single satellite. It is noted that the relative position estimation 330 and relative clock estimation 340 may be performed simultaneously for multiple EPE 310 pairs. In an embodiment, the relative clock estimation 340 may be performed with multiple EPEs 310 in proximity. That is, multiple EPEs that are in a predetermined distance from one other.

Figure 4:
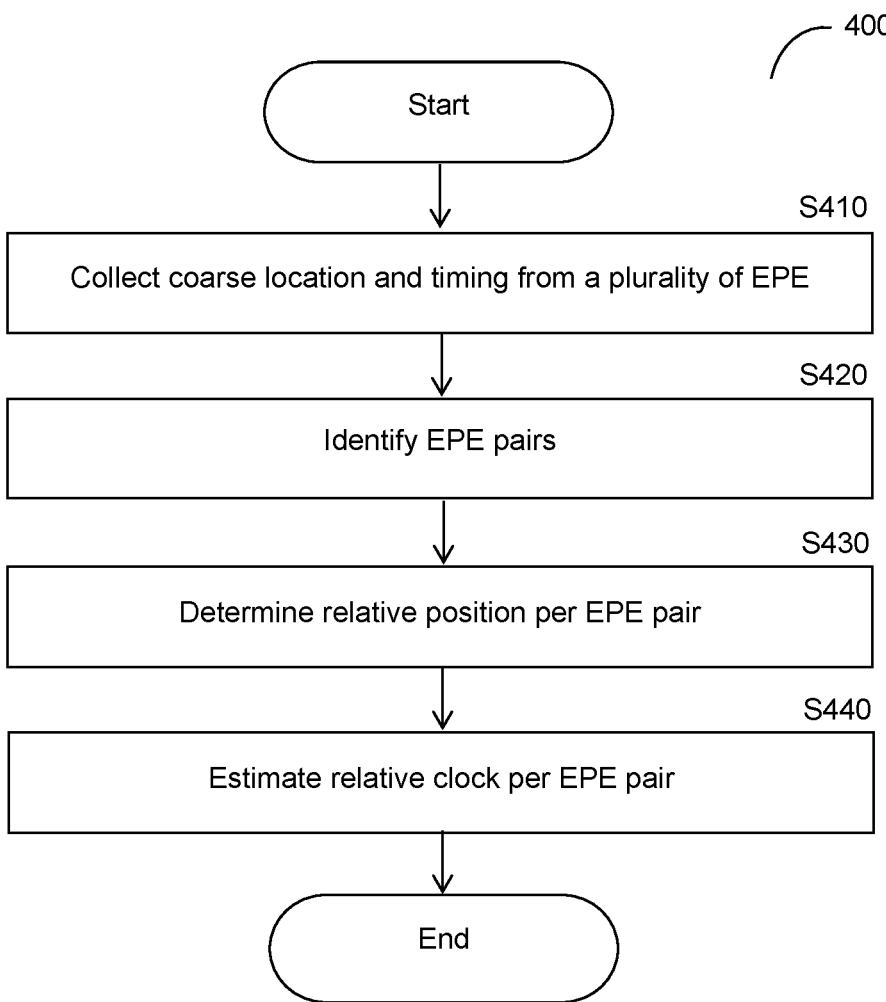
FIG. 4 is a flowchart illustrating a method for determining relative position and clock estimation according to an embodiment.

FIG. 4 is an example flowchart 400 illustrating a method for determining relative position and clock estimation according to an embodiment. In an embodiment, a coarse location and time derivation are made at each EPE, in particular by using the GNSS receiver, and the method is performed by the central computing server (120, FIG. 1A). It is noted that the method of FIG. 4 may be performed simultaneously at the server for multiple EPE pairs in the user satellite network.

At S410, coarse location and time from each of a plurality of EPE are collected at the central computing server. In an embodiment, such parameters are locally derived at each of the EPE, as a standalone mode, and may be saved at the memory before transmitting to the server. In another embodiment, the raw measurements may be provided to the server for the coarse location and timing of each EPE to be estimated at the server. In further embodiment, the measurements may be processed at the EPE prior to the central computing server for bias correction, time alignment, and the like. In another embodiment, data such as, but not limited to, SP3, ionospheric and tropospheric parameters, Differential Code Bias (DCB), and Inter-System bias (ISB) from a third party is incorporated to the process in order to provide more accurate estimations (i.e., Precise Point Positioning, PPP). Such standalone mode of operation is configured so that a GNSS receiver in a single EPE may preserve its clocks by correcting and tracking algorithms for a short amount of time (i.e., minutes), and thus reduce communication and complexity burden on the server side. It has been identified, however, that the small drifts in this mode may accumulate over time to eventually create a larger deviation of clock bias.

At S420, EPE pairs are identified. Two EPE in proximity of less than few kilometers (e.g., two kilometers) are identified as pairs. In an embodiment, the server holds locational information about each of the EPEs. In order to identify the best matching pair of the multiple EPEs in the vicinity, number of combinations of EPEs may be tested. In an embodiment, the identified EPE pairs are not permanently designated and may be reset as needed or after a certain period of time.

At S430, a relative position per EPE pair is determined. The relative position (or baseline) may be determined by differencing raw measurements of the EPE pair. In an embodiment, carrier phase measurements and ambiguity resolution algorithms are utilized to determine the baseline using a relative ranging approach. In another embodiment, a Precise Point Positioning (PPP) technique may be employed with ephemeris correction. In yet another embodiment, the relative ranging and PPP techniques may be combined.

At S440, a relative clock estimation per EPE pair is determined. The baseline estimation of the EPE pair is incorporated with differencing measurements to determine the relative clock per EPE pair. It should be noted that the relative clock estimation allows time synchronization between the EPE pairs. In an embodiment, reference satellite observables are taken in a single epoch to estimate a clock drift with high precision and to remove the multipath error by averaging data over a day period. In this scenario, clock drift, multipath errors, and other atmospheric errors may be removed to allow more accurate clock estimation. In another embodiment, the relative clock bias may be estimated instantaneously by isolating the phase ambiguity with known EPE Inter-System-Bias (ISB). The ISB may be obtained by each EPEs and may be utilized to reduce errors in clock estimations.

Figure 5:
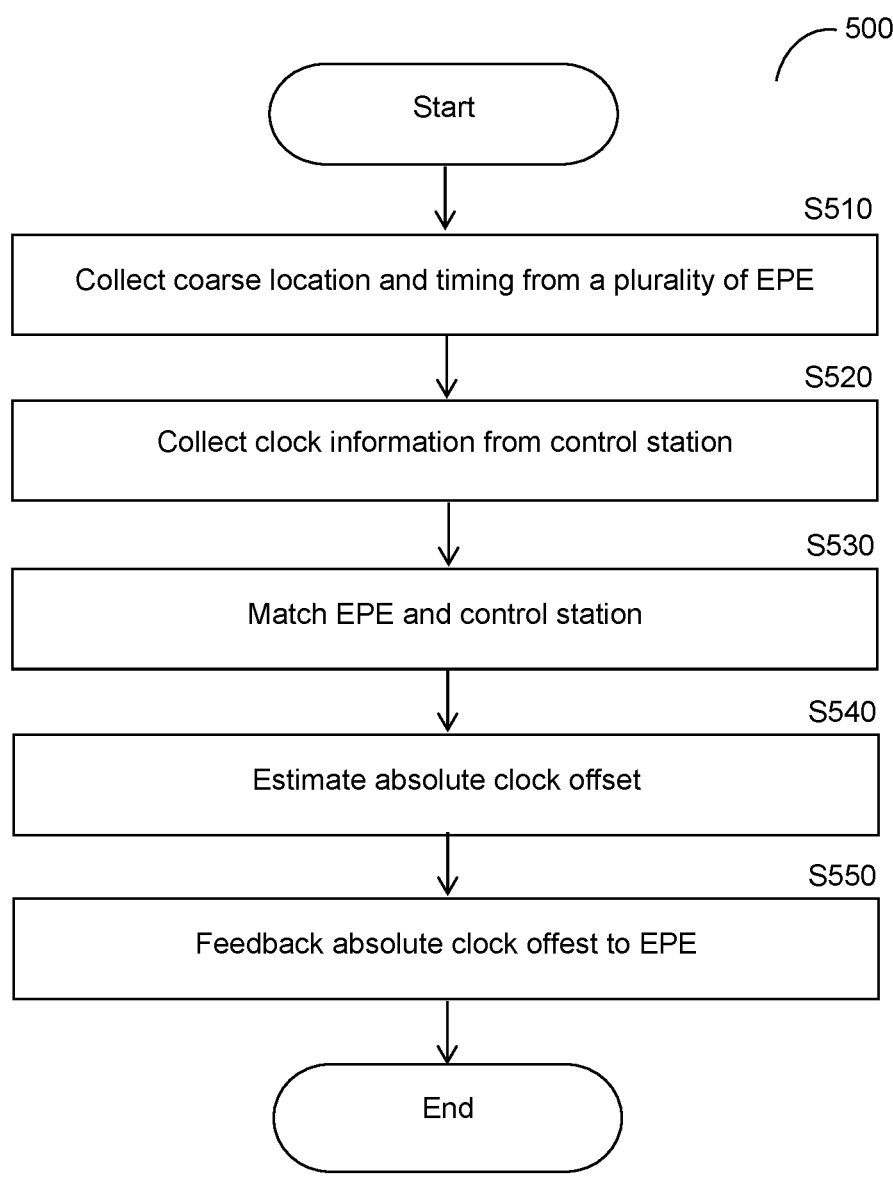
FIG. 5 is flowchart illustrating a method for determining absolute clock offset according to an embodiment.

FIG. 5 is an example flowchart 500 illustrating a method for determining absolute clock offset according to an embodiment. In an embodiment, the method is performed by the central computing server (120, FIG. 1A). In an embodiment, methods of FIG. 4 and FIG. 5 flowcharts may be combined to make use of the relative position and clock estimation of the EPE pairs in conjunction to information from the control station.

At S510, coarse location and timing from each of the plurality of EPEs are collected at the central computing server. In an embodiment, such parameters are locally derived at each of the EPE, as a standalone mode, and may be saved at the memory before transmitting to the server. In another embodiment, the raw measurements may be provided to the server, and thus the coarse location and timing of each EPE may be estimated at the server. In further embodiment, the measurements may be processed at the EPE prior to the central computing server for bias correction, time alignment, and the like.

At S520, clock information is collected from control stations. The control stations receive and relay satellite signals to the EPEs in the vicinity. In comparison to user EPEs, the control stations are more sparsely distributed, for example, one control station in 100s or 1000s of EPEs. These control stations are located at known locations with a very accurate clock source that may be utilized for resolving time offsets in the user satellite network. In an embodiment, other high-end receiver or high-end clock in the user satellite network may provide the accurate clock source. In an example embodiment, a dedicated EPE located in a premium location with a high-end oscillator integrated may act in place of the control station for the user satellite network. It is emphasized that the latest form of equipment is not necessarily limited to a control station.

At S530, an EPE is matched to a control station. Individual and EPE pairs may be matched with a control station in vicinity.

At S540, absolute clock offset is estimated. The absolute clock offset is between the EPE and the GNSS time and may be estimated by using positional and clock information from the matched EPEs and control stations. Here, baseline (i.e., relative position) estimations and weighted clock accuracy, based on clock quality, of multiple EPEs are incorporated with the control station information to increase clock offset accuracy. In an example embodiment, the positional and clock information may be obtained between a newly matched EPE and existing EPEs, which are time synchronized, in the network. In another example embodiment, such information may be obtained with respect to at least one control station within the network. In an embodiment, multiple control stations may be paired to each other and/or to a specific EPE to further improve the marginal error residual resulting in a single control station and EPE pair configuration. The estimation may be performed sequentially (i.e., each pair at a time) or in parallel fashion where multiple stations are paired with an EPE or in a hybrid fashion of both options listed above.

At S550, estimated absolute clock offset is provided back to the relevant EPEs. A feedback of the estimated absolute clock offset is communicatively sent to the relevant EPEs through the network for time synchronizing the EPEs. In an embodiment, the whole user satellite network including user EPEs and control stations may be time synchronized, and thus reduce error and increase positional accuracy in the satellite system. In an example embodiment, the relative and absolute clock estimations are performed sequentially. However, it should be noted that such relative and absolute clock estimations may be merged to be performed simultaneously.

In a further embodiment, the feedback to the relevant EPEs may include other analyses data to increase performance of individual and network of EPEs. Such data enables various corrections such as, but not limited to, Ionosphere errors, Troposphere errors, Inter-System-Bias, and carrier phase ambiguity. In a further embodiment, information from outside the user satellite network may be collected to reduce errors embedded in the satellite signals received, which may be performed in real-time or by post-processing. In an embodiment, the feedback information to the EPEs may be differential (i.e., relative to the existing state) or global to provide a global clock stamp.

In an example embodiment, individual EPEs may be introduced into the user satellite network at different time frames. To this end, the time synchronization within the network may function in synchronous, asynchronous, and/or hybrid modes. In the synchronous mode, the receivers in the network are time synchronized to the network clock and in the asynchronous mode, the EPE may perform individual coarse estimation (i.e., standalone mode) and/or relative positional and clock estimations. The hybrid mode may involve both asynchronous mode with synchronization at certain time intervals. Synchronization times may be predetermined or optimized to reduced load at the server and increase efficiency.

Figure 6:
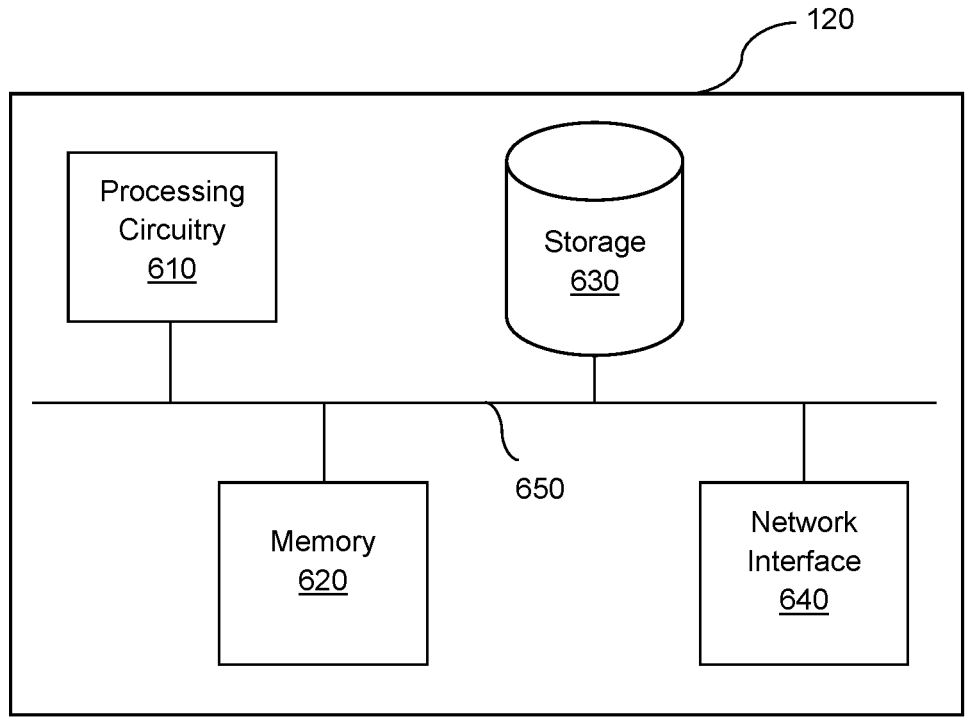
FIG. 6 is a schematic diagram of a central computing server according to an embodiment.

FIG. 6 is an example schematic diagram of a central computing server 120 according to an embodiment. The central computing server 120 includes a processing circuitry 610 coupled to a memory 620, a storage 630, and a network interface 640. In an embodiment, the components of the central computing server 120 may be communicatively connected via a bus 650.

The processing circuitry 610 may be realized as one or more hardware logic components and circuits. For example, and without limitation, illustrative types of hardware logic components that can be used include field programmable gate arrays (FPGAs), application-specific integrated circuits (ASICs), Application-specific standard products (ASSPs), system-on-a-chip systems (SOCs), graphics processing units (GPUs), tensor processing units (TPUs), general-purpose microprocessors, microcontrollers, digital signal processors (DSPs), and the like, or any other hardware logic components that can perform calculations or other manipulations of information. The memory 620 may be volatile (e.g., random access memory, etc.), non-volatile (e.g., read only memory, flash memory, etc.), or a combination thereof.

In one configuration, software for implementing one or more embodiments disclosed herein may be stored in the storage 630. In another configuration, the memory 620 is configured to store such software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the processing circuitry 610, cause the processing circuitry 610 to perform the various processes described herein.

The storage 630 may be magnetic storage, optical storage, and the like, and may be realized, for example, as flash memory or other memory technology, compact disk-read only memory (CD-ROM), Digital Versatile Disks (DVDs), Flash memory or solid-state-device (SSD) or any other medium which can be used to store the desired information.

The network interface 640 allows the central computing server 120 to communicate with, for example, the network 110.

It should be understood that the embodiments described herein are not limited to the specific architecture illustrated in FIG. 6, and other architectures may be equally used without departing from the scope of the disclosed embodiments.

The various embodiments disclosed herein can be implemented as hardware, firmware, software, or any combination thereof. Moreover, the software is preferably implemented as an application program tangibly embodied on a program storage unit or computer readable medium consisting of parts, or of certain devices and/or a combination of devices. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such a computer or processor is explicitly shown. In addition, various other peripheral units may be connected to the computer platform such as an additional data storage unit and a printing unit. Furthermore, a non-transitory computer readable medium is any computer readable medium except for a transitory propagating signal.

All examples and conditional language recited herein are intended for pedagogical purposes to aid the reader in understanding the principles of the disclosed embodiment and the concepts contributed by the inventor to furthering the art, and are to be construed as being without limitation to such specifically recited examples and conditions. Moreover, all statements herein reciting principles, aspects, and embodiments of the disclosed embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

It should be understood that any reference to an element herein using a designation such as "first," "second," and so forth does not generally limit the quantity or order of those elements. Rather, these designations are generally used herein as a convenient method of distinguishing between two or more elements or instances of an element. Thus, a reference to first and second elements does not mean that only two elements may be employed there or that the first element must precede the second element in some manner. Also, unless stated otherwise, a set of elements comprises one or more elements.

As used herein, the phrase "at least one of" followed by a listing of items means that any of the listed items can be utilized individually, or any combination of two or more of the listed items can be utilized. For example, if a system is described as including "at least one of A, B, and C," the system can include A alone; B alone; C alone; 2A; 2B; 2C; 3A; A and B in combination; B and C in combination; A and C in combination; A, B, and C in combination; 2A and C in combination; A, 3B, and 2C in combination; and the like.

What is claimed is:

1. A method for timing synchronization of global navigation satellite system (GNSS) receivers, comprising:

iteratively matching each end point equipment (EPE) of a plurality of EPEs to at least one control station that is within a predetermined distance of the EPEs of the plurality, wherein each EPE of the plurality includes a GNSS receiver clock, wherein the plurality of EPEs and the at least one control station are in a user satellite communication network;

determining a relative position of each matched EPE and the at least one control station based on differencing of raw measurements, wherein a plurality of relative positions is collected, one for each respective determined relative position of each matched EPE and the at least one control station;

estimating an absolute clock offset based on clock information of the at least one control station and the plurality of relative positions, wherein the absolute clock offset is an offset between a time of a first EPE of the plurality of EPEs and GNSS time; and causing a time synchronization in the first EPE of the plurality of EPEs based on the estimated absolute clock offset;

wherein the matching, determining, estimating, and causing are performed at a central entity.

2. The method of claim 1, further comprising:

determining, based on a relative position and single difference raw measurements, a relative clock estimation between EPE pairs of the plurality of EPEs, wherein each EPE pair includes two EPEs in a proximity; and synchronizing times between the EPE pairs based on the determined relative clock estimation.

3. The method of claim 2, further comprising:

collecting a coarse location and a time from a plurality of EPEs; and determining a relative position between the EPE pairs based on differencing raw measurements of the EPE pairs.

4. The method of claim 2, wherein the EPE pairs are temporal and determined based on the location of the two EPEs in the EPE pair.

5. The method of claim 2, wherein the EPE pairs receive signals from a single satellite.

6. The method of claim 1, wherein the relative position is determined using at least one of: a relative ranging approach, based on carrier phase measurements and ambiguity resolution algorithms, and a precise point positioning (PPP) technique with ephemeris correction.

7. The method of claim 1, wherein the raw measurements include at least one of: code phase, carrier phase, frequency doppler shifts, and tracking status flags.

8. The method of claim 1, wherein the control station is any one of: a GNSS control station, a high-end receiver, a high-end clock, and a dedicated EPE.

9. The method of claim 1, wherein causing the time synchronization is performed in at least one of: a synchronous mode, an asynchronous mode, and a hybrid mode.

10. The method of claim 1, wherein the relative position is determined using at least ambiguity resolution algorithms.

11. The method of claim 1, wherein the plurality of EPEs includes at least three EPEs and wherein the causing step causes the time synchronization based on the estimated absolute clock offset in the at least three EPEs of the plurality of EPEs.

12. A non-transitory computer readable medium having stored thereon instructions for causing a processing circuitry to execute a process for timing synchronization of global navigation satellite system (GNSS) receivers, the process comprising:

iteratively matching each end point equipment (EPE) of a plurality of EPEs to at least one control station that is within a predetermined distance of the EPEs of the plurality, wherein each EPE of the plurality includes a GNSS receiver clock, wherein the plurality of EPEs and the at least one control station are in a user satellite communication network;

determining a relative position of each matched EPE and the at least one control station based on differencing of raw measurements, wherein a plurality of relative positions is collected, one for each respective determined relative position of each matched EPE and the at least one control station;

estimating an absolute clock offset based on clock information of the at least one control station and the plurality of relative positions, wherein the absolute clock offset is an offset between a time of a first EPE of the plurality of EPEs and GNSS time; and causing a time synchronization in the first EPE of the plurality of EPEs based on the estimated absolute clock offset;

wherein the processing circuitry executing the matching, determining, estimating, and causing is a central entity.

13. A system for timing synchronization of global navigation satellite system (GNSS) receivers, comprising:

a processing circuitry; and a memory, the memory containing instructions that, when executed by the processing circuitry, configure the system to:

iteratively match each end point equipment (EPE) of a plurality of EPEs to at least one control station that is within a predetermined distance of the EPEs of the plurality, wherein each EPE of the plurality includes a GNSS receiver clock, wherein the plurality of EPEs and the at least one control station are in a user satellite communication network;

determining a relative position of each matched EPE and the at least one control station based on differencing of raw measurements, wherein a plurality of relative positions is collected, one for each respective determined relative position of each matched EPE and the at least one control station;

determine a relative position of each matched EPE and the at least one control station based on differencing of raw measurements, wherein a plurality of relative positions is collected of the determined relative position of each matched EPE and the at least one control station;

estimate an absolute clock offset based on clock information of the at least one control station and the plurality of relative positions, wherein the absolute clock offset is an offset between a time of a first EPE of the plurality of EPEs and GNSS time; and cause a time synchronization in the first EPE of the plurality of EPEs based on the estimated absolute clock offset;

wherein the system is a central entity.

14. The system of claim 13, wherein the system is further configured to:

determine, based on a relative position and single difference raw measurements, a relative clock estimation between EPE pairs of the plurality of EPEs, wherein each EPE pair includes two EPEs in a proximity; and synchronize times between the EPE pairs based on the determined relative clock estimation.

15. The system of claim 14, wherein the system is further configured to:

collect a coarse location and a time from a plurality of EPEs; and determine a relative position between the EPE pairs based on differencing raw measurements of the EPE pairs.

16. The system of claim 14, wherein the EPE pairs are temporal and determined based on the location of the two EPEs in the EPE pair.

17. The system of claim 14, wherein the EPE pairs receives signals from a single satellite.

18. The system of claim 13, wherein the relative position is determined using at least one of: a relative ranging approach, based on carrier phase measurements and ambiguity resolution algorithms, and a precise point positioning (PPP) technique with ephemeris correction.

19. The system of claim 13, wherein the raw measurements include at least one of: code phase, carrier phase, frequency doppler shifts, and tracking status flags.

20. The system of claim 13, wherein the control station is any one of: a GNSS control station, a high-end receiver, a high-end clock, and a dedicated EPE.

21. The system of claim 13, wherein causing the time synchronization is performed in at least one of: a synchronous mode, an asynchronous mode, and a hybrid mode.

\* \* \* \* \*